(12) United States Patent
Mizutani et al.

(10) Patent No.: US 9,310,133 B2
(45) Date of Patent: Apr. 12, 2016

(54) ROTARY HEARTH FURNACE EXHAUST GAS DUCT APPARATUS AND METHOD FOR OPERATING SAME

(75) Inventors: Noriaki Mizutani, Kobe (JP); Koji Tokuda, Kobe (JP); Osamu Tsuge, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 449 days.

(21) Appl. No.: 13/820,174

(22) PCT Filed: Sep. 2, 2011

(86) PCT No.: PCT/JP2011/070032
§ 371 (c)(1),
(2), (4) Date: Mar. 1, 2013

(87) PCT Pub. No.: WO2012/029947
PCT Pub. Date: Mar. 8, 2012

(65) Prior Publication Data
US 2013/0154167 A1    Jun. 20, 2013

(30) Foreign Application Priority Data
Sep. 2, 2010    (JP) .................................. 2010-196415

(51) Int. Cl.
F27D 17/00    (2006.01)
C21B 13/10    (2006.01)
(Continued)

(52) U.S. Cl.
CPC ............ F27D 17/002 (2013.01); C21B 13/105 (2013.01); C21C 5/40 (2013.01);
(Continued)

(58) Field of Classification Search
CPC ........... C21B 13/105; F27B 9/16; F27B 9/30; C21C 5/40; F27D 17/008; F27D 17/002; F27D 17/001

USPC ...................... 266/46, 148, 145, 157; 75/484; 110/203, 205, 215, 216
See application file for complete search history.

(56) References Cited

U.S. PATENT DOCUMENTS 6,251,161 B1 *   6/2001   Tateishi et al. .................. 75/484
6,946,022 B2 *   9/2005   Okuda et al. .................... 96/281
8,268,231 B2 *   9/2012   Tsutsumi et al. ............... 266/44
2004/0219085 A1 * 11/2004   Ogawa ...................... 423/240 R

FOREIGN PATENT DOCUMENTS

JP    2001-89805 A    4/2001
JP    2001-181720 A   7/2001
(Continued)

OTHER PUBLICATIONS

International Search Report and Written Opinion of the International Searching Authority Issued Nov. 15, 2011 in PCT/JP2011/070032 (with English translations).

*Primary Examiner* — Scott Kastler
*Assistant Examiner* — Michael Aboagye
(74) *Attorney, Agent, or Firm* — Oblon, McClelland, Maier & Neustadt, L.L.P.

(57) ABSTRACT

An exhaust gas duct apparatus for use in a rotary-hearth furnace for heating a starting material including a carbonaceous reducing material and an iron-oxide containing material to produce reduced iron or granular metallic iron. In an exhaust gas duct for use in the rotary-hearth furnace, a cooling part for cooling an exhaust gas discharged from the rotary-hearth furnace to solidify a metal salt in the exhaust gas, a collision part for allowing the exhaust gas just after being cooled to collide therewith to drop down the metal salt solidified, and a direction change duct for guiding the exhaust gas after being collided, in a direction other than a direction of dropping the metal salt, are arranged in this order in two stages.

16 Claims, 3 Drawing Sheets

(51) Int. Cl.
  *F27B 9/16* (2006.01)
  *F27B 9/30* (2006.01)
  *C21C 5/40* (2006.01)
(52) U.S. Cl.
  CPC .. *F27B 9/16* (2013.01); *F27B 9/30* (2013.01); *F27D 17/001* (2013.01); *F27D 17/008* (2013.01); *Y02P 10/136* (2015.11); *Y02P 10/283* (2015.11)

(56) References Cited

FOREIGN PATENT DOCUMENTS

| | | | |
|---|---|---|---|
| JP | 2003-35492 | A | 2/2003 |
| JP | 2004-243216 | A | 9/2004 |
| JP | 2008-106952 | A | 5/2008 |
| JP | 4427267 | B2 | 3/2010 |
| WO | WO 2008126759 | * | 10/2008 .............. F27D 17/00 |

* cited by examiner

ROTARY HEARTH FURNACE EXHAUST GAS DUCT APPARATUS AND METHOD FOR OPERATING SAME

TECHNICAL FIELD

The present invention relates to a exhaust gas duct apparatus for use in a rotary-hearth furnace and a method for operating the same. More specifically, the invention relates to an exhaust gas duct apparatus placed in a duct intermediate part connected to a dust collector in order to treat an exhaust gas generated in a rotary-hearth furnace in which a starting material including a carbonaceous reducing material and an iron-oxide containing material is heated to produce reduced iron or granular metallic iron, and a method for operating the same.

BACKGROUND ART

Conventionally, there is known a rotary-hearth furnace including an outer circumferential wall, an inner circumferential wall, and an annular rotary hearth interposed between these walls. The rotary hearth, generally, is constituted of an annular furnace body frame, a hearth heat insulator placed on the furnace body frame, and a refractory placed on the hearth heat insulator.

The rotary-hearth furnace having such structure has been used, for example, for heat treating metals such as steel billets or for combustion treating combustible wastes. Recently, a method for producing reduced iron from iron oxide using the rotary-hearth furnace has been focused. An example of such processes for producing reduced iron using the rotary-hearth furnace is described below with reference to FIG. 6 which shows the schematic structure of the rotary-hearth furnace.

Firstly, an iron oxide (such as an iron ore or steelmaking dust) and a carbonaceous reducing material (such as coal or coke) are mixed and granulated to produce a pellet or a briquette (agglomerate). When the pellet or briquette is heated to a temperature area such that a combustible volatile matter to be generated from such pellet or briquette is not ignited, the adhered water thereof is removed to produce a dry pellet or dry briquette.

Such dry pellet or dry briquette (starting material 24 of reduced iron) is supplied to a rotary-hearth furnace 26 using a proper inserting device 23 to form a pellet or briquette layer on a rotary hearth 21. The pellet or briquette layer, while rotating in the black arrow direction, is radiation-heated and reduced due to the combustion of a combustion burner 27 placed on the upper part of the furnace, thereby advancing its metallization. Next, the thus metalized reduced iron 25 is cooled by a cooler 28 and, after it develops mechanical strength capable of withstanding a handling operation when and after it is discharged, it is discharged to the outside of the furnace by a discharge device 22. Just after discharge of the metalized reduced iron 25, a new dry pellet or a dry briquette (starting material 24 of reduced iron) is inserted; and, the above process is repeated to thereby produce reduced iron (see, for example Patent Document 1).

In the rotary-hearth furnace used for the production of such reduced iron, an exhaust gas generated in the furnace is guided from an exhaust gas discharge area placed on the circumference of the rotary-hearth furnace to an exhaust duct connected to the ceiling part of this exhaust gas discharge area. The exhaust gas guided to the exhaust duct is treated by exhaust gas treatment equipment placed in the intermediate part or downstream of the exhaust duct, and is then discharged to the outside of this system. However, there is known a problem that, as various volatile impurities are generated during the reducing process or melting process of the reduced iron material, the exhaust duct can clog or corrode, or a refractory can be damaged.

Thus, as a method for operating such conventional exhaust gas treatment apparatus, there is proposed a method for preventing the clogging of an exhaust gas suction duct or the damage of a lined refractory (see Patent Document 2). In this method, by supplying any one or more of an inert gas, gas-water state water and air to an exhaust gas of 1100° C. or higher discharged from the rotary-hearth furnace, the exhaust gas temperature within the exhaust gas suction duct is cooled to from 900 to 1100° C.

Further, recently, there has been developed a process for producing a high-purity granular metallic iron. In this process, a starting material including a carbonaceous reducing material and an iron oxide-containing material is heated in a reducing melting furnace such as a rotary-hearth furnace to solid-reduce the iron oxide in this start material, and the yielded metallic iron is then further heated to be molten, and it is aggregated while separating it from the slab components.

However, this process for producing the granular metallic iron has a problem regarding the increase of the amount of the exhaust gas and increases of the exhaust gas temperature. That is, when the amount of the exhaust gas increases, since the capacity of apparatus equipped downstream thereof such as the exhaust gas duct apparatus and exhaust gas treatment apparatus is increased, the facility cost increases as well as the running cost necessary to solve the problem involved with dust adhesion or accumulation increases. Also, when the exhaust gas temperature increases, higher heat resistance is required in the equipment placed downstream, which further increases the facility cost and running cost.

CITATION LIST

Patent Documents

Patent Document 1: JP-A-2001-181720
Patent Document 2: JP-B-4427267

DISCLOSURE OF THE INVENTION

Problems that the Invention is to Solve

An object of this invention is to provide an exhaust gas duct apparatus for use in a rotary-hearth furnace for heating a starting material including a carbonaceous reducing material and an iron oxide-containing material to produce reduced iron or granular metallic iron, which, while avoiding a problem involved with the increase of the exhaust gas amount and increase of the exhaust gas temperature, can collect dust and can be operated long and stably with high heat efficiency, and a method for operating such apparatus.

Means for Solving the Problems

In order to achieve such an object, the exhaust gas duct apparatus for use in a rotary-hearth furnace of the present invention relates to an exhaust gas duct apparatus for use in a rotary-hearth furnace for heating a starting material including a carbonaceous reducing material and an iron-oxide containing material to produce reduced iron or granular metallic iron, wherein, in an exhaust gas duct for use in the rotary-hearth furnace, a cooling part for cooling an exhaust gas discharged from the rotary-hearth furnace to solidify a metal salt in the exhaust gas, a collision part for allowing the exhaust gas just after being cooled to collide therewith to drop down the metal salt solidified, and a direction change duct for guiding the exhaust gas after being collided in a direction other than a direction of dropping the metal salt, are arranged in this order in two stages.

The cooling part preferably includes a first cooling part for cooling the exhaust gas discharged from the rotary-hearth furnace to a temperature of from 1000 to 1200° C., and a second cooling part for further cooling the exhaust gas after being collided, to a temperature of from 450 to 900° C.

The collision part preferably includes a first collision part placed just behind the first cooling part in the exhaust gas duct, and a second collision part placed connect to a rear part of the second cooling part in the exhaust gas duct.

The first cooling part preferably includes a water cooling duct.

The water cooling duct is preferably arranged horizontally just before the first collision part.

No water cooling structure is preferably provided on an upper part of the water cooling duct.

The water cooling duct preferably has a lined refractory structure, and the lined refractory structure in a lower part of the water cooling duct to which a dust can be easily adhered is preferably constituted such that an inner surface temperature thereof is 600° C. or lower.

The second cooling part preferably injects a fluid directly into the exhaust gas duct.

The direction change duct preferably includes a first riser extending substantially vertically upwardly, the first collision part preferably includes a first riser inner wall surface, and the first riser inner wall surface for allowing the exhaust gas existing at least just behind the water cooling duct to collide therewith is preferably covered with an abrasion resistant refractory.

The direction change duct preferably includes a horizontal duct substantially horizontally arranged in a lowermost part of an inverted J-shaped duct connected to and descending from a top part of the first riser, the second collision part is preferably a dust collecting tank placed in the horizontal duct, the second cooling part is preferably placed in at least any one of the first riser and the inverted J-shaped duct, and the exhaust gas cooled through the second cooling part is preferably allowed to be collided with the second collision part.

The exhaust gas allowing to be collided with the second collision part is preferably allowed to rise through a second riser, and an air preheater is preferably placed in a lowering duct connected to a rear part of the second riser.

In a method for operating the exhaust gas duct apparatus for use in a rotary-hearth furnace according to the present invention, a cooling temperature of the cooling part for cooling the exhaust gas can be changed depending on a kind of the metal salt in the exhaust gas.

In a method for operating the exhaust gas duct apparatus for use in a rotary-hearth furnace according to the present invention, the second cooling part preferably cools the exhaust gas by directly supplying any one or more of an inert gas, gas-water state water and air to the exhaust gas.

Effects of the Invention

According to the exhaust gas duct apparatus of the invention for use in a rotary-hearth furnace, since the metal salt contained in the exhaust gas is solidified in two stages and is then collected, the solidification efficiency and collection efficiency of the metal salt can be enhanced, and the adhesion and accumulation within the exhaust duct can be minimized, whereby the long and stable operation of the exhaust gas duct apparatus can be attained.

According to a preferred embodiment of the invention, since the cooling part includes a first cooling part for cooling the exhaust gas discharged from the rotary-hearth furnace to a temperature of from 1000 to 1200° C., and a second cooling part for further cooling the exhaust gas after being collided to a temperature of from 450 to 900° C., the high-melting point metal salt and low-melting point metal salt contained in the exhaust gas can be solidified effectively in two cooling temperature stages.

According to a preferred embodiment of the invention, since the collision part includes a first collision part placed just behind the first cooling part in the exhaust gas duct, and a second collision part placed connect to a rear part of the second cooling part in the exhaust gas duct, the metal salt contained in the exhaust gas can be solidified further effectively.

According to a preferred embodiment of the invention, since the first cooling part includes a water cooling duct, the size of the duct can be minimized, the facility cost of the duct, refractory and the like can be controlled and the maintenance thereof can also be facilitated.

According to a preferred embodiment of the invention, since the water cooling duct is arranged horizontally just before the first collision part, the combination of the water cooling duct with the first collision part can surely realize the solidification of the high-melting point metal salt contained in the exhaust gas.

According to a preferred embodiment of the invention, since no water cooling structure is provided on an upper part of the water cooling duct, the water cooling structure of the upper part of the water cooling duct to which a dust is hardly adhered can be eliminated, thereby being able to reduce the facility cost.

According to a preferred embodiment of the invention, since the water cooling duct has a lined refractory structure and the lined refractory structure in a lower part of the water cooling duct to which a dust can be easily adhered is constituted such that an inner surface temperature thereof is 600° C. or lower, the high-melting point metal salt can be solidified perfectly.

According to a preferred embodiment of the invention, since the second cooling part injects a fluid directly into the exhaust gas duct, the exhaust gas can be cooled directly, thereby being able to enhance the cooling efficiency.

According to a preferred embodiment of the invention, since the direction change duct includes a first riser extending substantially vertically upwardly, the first collision part includes a first riser inner wall surface, and the first riser inner wall surface for allowing the exhaust gas existing just behind the water cooling duct to collide therewith is covered with an abrasion resistant refractory, the abrasion of the refractory due to dust contained in the exhaust gas can be minimized.

According to a preferred embodiment of the invention, the direction change duct includes a horizontal duct arranged substantially horizontally in a lowermost part of an inverted J-shaped duct connected to and descending from a top part of the first riser, the second collision part is a dust collecting tank placed in the horizontal duct, the second cooling part is placed in at least any one of the first riser and the inverted J-shaped duct, and the exhaust gas cooled through the second cooling part is allowed to be collided with the second collision part. Due to this, the low-melting point metal salt, which neither could have been solidified by the first cooling part nor could have been separated into its solid component and its gas component by the first collision part, can be solidified and can be separated into its solid component and its gas component, whereby it can be collected as dust.

According to a preferred embodiment of the invention, since the exhaust gas allowing to be collided with the second collision part is allowed to rise through a second riser and an air preheater is placed in a lowering duct connected to a rear part of the second riser, the dust is removed sufficiently due to the two-stage collision performed by the first and second collision parts. Therefore, since the temperature of the pre-heat air can be increased, the fuel reduction of the combustion burner and the size reduction of the exhaust gas treatment apparatus can be attained.

On the other hand, according to an embodiment of a method for operating the exhaust gas duct apparatus of the invention for use in a rotary-hearth furnace, since the cooling temperature of the cooling part for cooling the exhaust gas can be changed depending on a kind of the metal salt in the exhaust gas, the solidification of the metal salt can be carried out effectively and surely.

According to an embodiment of a method for operating the exhaust gas duct apparatus of the invention for use in a rotary-hearth furnace, since the second cooling part cools the exhaust gas by supplying directly any one or more of an inert gas, gas-water state water and air to the exhaust gas, the low-melting point metal salt contained in the exhaust gas can be solidified further effectively.

EMBODIMENTS FOR CARRYING OUT THE INVENTION

Firstly, a exhaust gas duct apparatus according to an embodiment of the invention for use in a rotary-hearth furnace is described with reference to FIGS. 1 to 4, while taking an exhaust gas duct apparatus for use in a rotary-hearth furnace for producing a granular metallic iron as an embodiment example.

Figure 1:
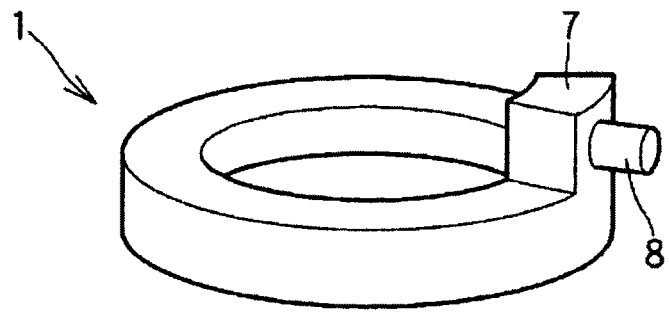
FIG. 1 is a perspective view of the outer shape of the main body of a rotary-hearth furnace according to an embodiment of the invention.
Figure 2:
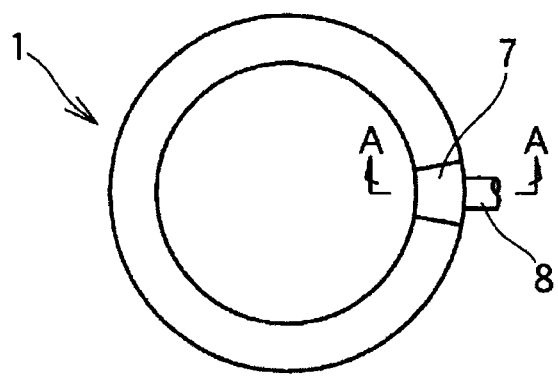
FIG. 2 is a plan view of the main body of a rotary-hearth furnace in FIG. 1.
Figure 3:
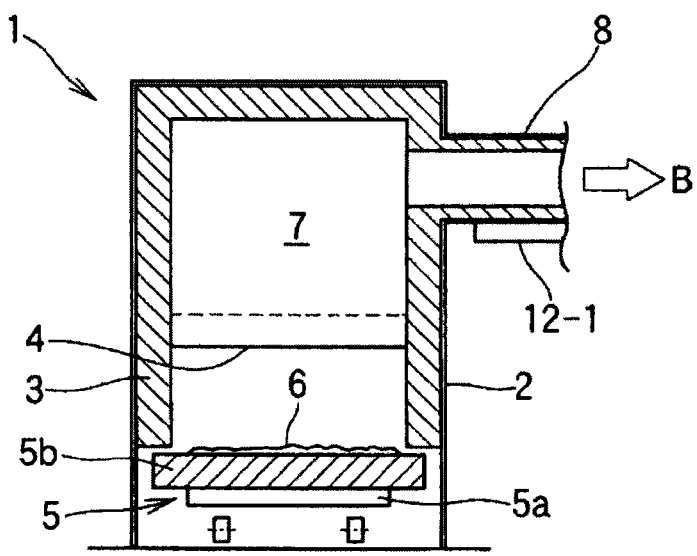
FIG. 3 is an enlarged sectional elevational view of the arrow A-A portion in FIG. 2.
Figure 4:
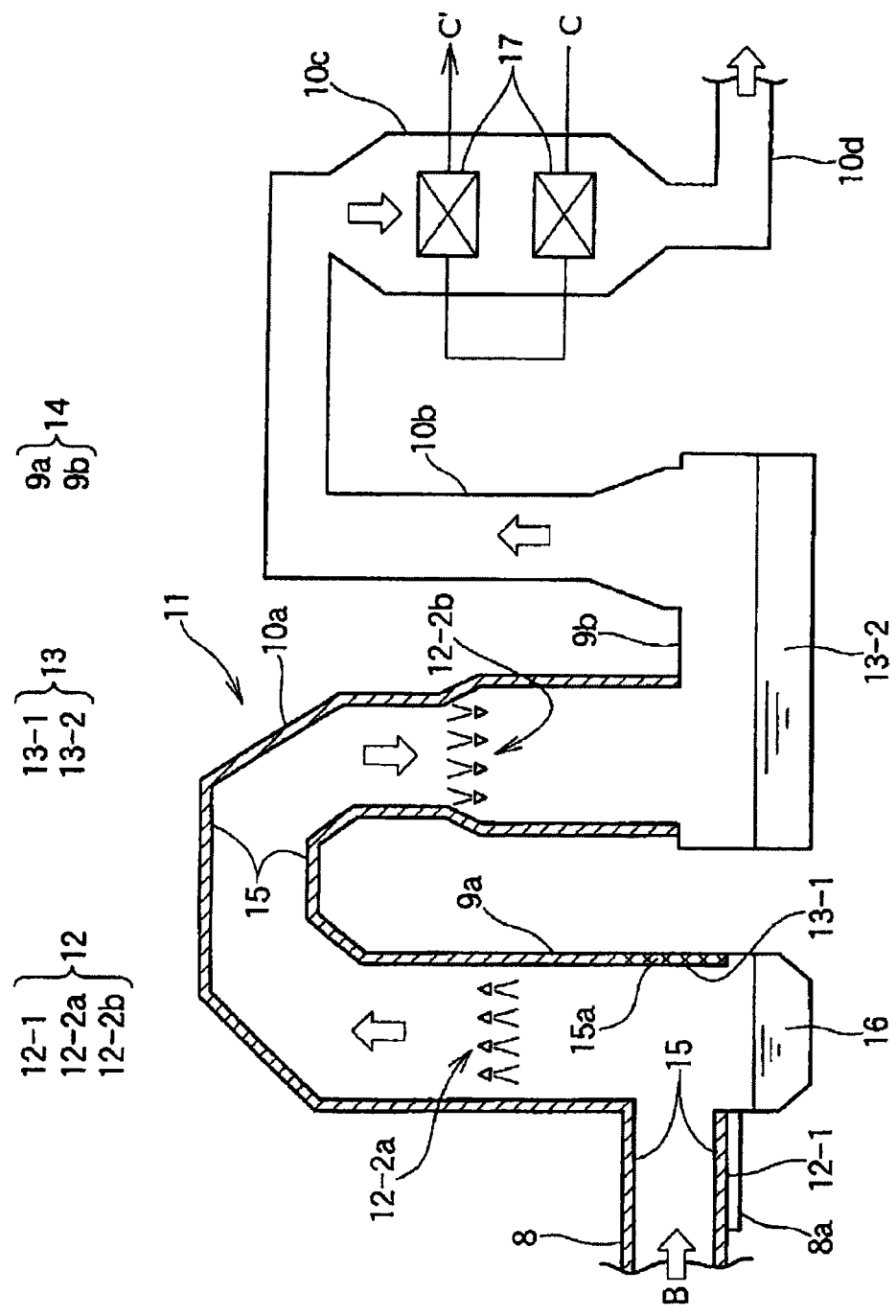
FIG. 4 is a typical sectional elevational view of an exhaust gas duct apparatus connected behind the arrow B in FIG. 3.

FIG. 1 is a perspective view of the outer shape of the main body of a rotary-hearth furnace according to an embodiment of the invention; FIG. 2 is a plan view of the main body of a rotary-hearth furnace in FIG. 1; FIG. 3 is an enlarged sectional elevational view of the arrow A-A portion in FIG. 2; and FIG. 4 is a typical sectional elevational view of an exhaust gas duct apparatus connected behind the arrow B in FIG. 3.

This rotary-hearth furnace 1 includes an outer circumferential wall 2, an inner circumferential wall 3 provided inside thereof, a ceiling part 4 for covering from above a space between the outer circumferential wall 2 and inner circumferential wall 3, and an annular rotary hearth 5 placed between the outer circumferential wall 2 and inner circumferential wall 3. The outer circumferential wall 2, inner circumferential wall 3 and ceiling part 4 are made mainly of a heat insulating material.

The rotary hearth 5 is driven by a driving device (not shown) so as to rotate on the circumference thereof while passing through between the outer circumferential wall 2 and inner circumferential wall 3. This rotary hearth 5 is constituted of a circular furnace body frame 5a and a hearth insulator or refractory 5b placed on the furnace body frame 5a. On this rotary hearth 5, there exists a starting material (which is hereinafter called a starting material for reduced iron material or granular metallic iron) 6 including a carbonaceous reducing material and an iron oxide-containing material, which is inserted therein from an insertion opening (not shown). This starting material 6 for reduced iron or granular metallic iron is subjected to a heat treatment and a reduction treatment or reducing and melting treatment in the furnace with the rotation of the rotary hearth 5. Such treatments produce reduced iron or granular metallic iron.

In the ceiling part 4 of this rotary-hearth furnace 1, an exhaust gas discharge chamber 7 is provided. This exhaust gas discharge chamber 7 constitutes a part of the ceiling part 4 in the circumferential direction (that is, the rotation direction of the rotary hearth 5). This exhaust gas discharge chamber 7 projects upwardly beyond the remaining parts of the ceiling part 4 and has a lower surface existing higher than the lower surfaces of the remaining parts of the ceiling part 4. And, an exhaust gas duct 8 for guiding an exhaust gas discharged from the rotary-hearth furnace 1 to an exhaust gas duct apparatus to be described below is horizontally connected to the exhaust gas discharge chamber 7 in communication therewith.

An exhaust gas duct apparatus 11 according to the embodiment of the invention for use in a rotary-hearth furnace is connected to the rear part of the exhaust gas duct 8 and is also provided in an intermediate duct part on the way to an exhaust gas treating apparatus such as a cooler, a dust collector and an exhaust fan which are not shown in FIG. 4.

This exhaust gas duct apparatus 11 includes a cooling part 12 for cooling rapidly an exhaust gas discharged from the rotary-hearth furnace 1 to solidify a metal salt contained in the exhaust gas, a collision part 13 for allowing the exhaust gas, just after being cooled, to collide therewith to thereby drop down the solidified metal salt, and a direction change duct 14 for guiding the exhaust gas after being collided in a direction other than the direction of dropping the metal salt.

The cooling part 12 includes a water cooling duct (first cooling part) 12-1, and spray nozzles (second cooling part) 12-2a and 12-2b. The water cooling duct 12-1 cools an exhaust gas of 1200° C. or higher discharged from the rotary-hearth furnace 1 down to from 1000 to 1200° C. to thereby solidify the high-melting point metal salt. The spray nozzles 12-2a and 12-2b cool the exhaust gas after being collided further down to from 450 to 900° C. to thereby solidify the low-melting point metal salt.

The melting point of the metal salt (for example, $Na_2SO_4$, $K_2SO_4$, $Na_3Fe(SO_4)_3$, $K_3Fe(SO_4)_3$ and the like), which is produced in a process for reducing a granular metallic iron material and is contained in the exhaust gas, extends in a wide range of from 450 to 1200° C. Thus, since various metal salts cannot be solidified in one stage of cooling, in this embodiment, as described above, the exhaust gas from the rotary-hearth furnace 1 is cooled in two stages.

Also, the collision part 13, the details of which are described later, includes a first riser inner wall surface (first collision part) 13-1 placed in the exhaust gas duct just behind the water cooling duct 12-1, and a second dust collecting tank (second collision part) 13-2 placed in the exhaust gas duct and connected to the rear parts of the spray nozzles 12-2a, 12-2b. Further, the direction change duct 14 includes a first riser (first direction change duct) 9a for changing the direction of the exhaust gas after being collided with the first riser inner wall surface 13-1 to a substantially upward direction, and a horizontal duct (second direction change duct) 9b for changing the direction of the exhaust gas after being collided with the second dust collecting tank 13-2 to a horizontal direction.

The water cooling duct 12-1 includes a water cooling jacket 8a and is arranged horizontally just before the first riser inner wall surface 13-1. However, since dust is hard to attach to the upper part of the water cooling duct 12-1, the water cooling duct 12-1 may not include a water cooling structure, but only the lower part of the duct may have the water cooling jacket 8a. On the other hand, the first riser inner wall surface 13-1 is arranged just behind the water cooling duct 12-1 and is constituted such that the exhaust gas within the water cooling duct 12-1 can collide with the first riser inner wall surface 13-1 and the direction of the exhaust gas can be thereby changed substantially vertically upwardly along the inner surface of the first riser 9a. By the thus structured exhaust gas duct apparatus 11, among various kinds of metal salt contained the exhaust gas discharged from the rotary-hearth furnace 1, the metal salt having a melting point of from 1000 to 1200° C. can be effectively solidified into dust. Thus, the exhaust gas can be divided into its solid component and its gas component efficiently.

After being divided into the solid component and gas component, the exhaust gas rises along the first riser 9a, whereas the solidified high-melting point metal salt drops down as dust and is collected into the first dust collecting tank 16. By discharging periodically or successively the dust collected into the first dust collecting tank 16, the adhesion or accumulation of the metal salt within the exhaust duct can be minimized, whereby the long stable operations of the exhaust gas duct apparatus 11 and the exhaust gas treatment apparatus are possible.

The first direction change duct 9a may not always be a duct (first riser 9a) extending substantially perpendicularly upwardly but may also be a duct extending in a direction oblique to the sheet surface of FIG. 4 or direction substantially perpendicular to the sheet surface of FIG. 4. However, the first direction change duct 9a preferably changes the exhaust gas just after the water cooling duct 12-1 to a direction having at least 70 degrees relative to the horizontal flow direction of this exhaust gas.

Further, an inverted J-shaped duct 10a is connected to the top part of the first riser 9a and descends therefrom. The spray nozzle 12-2a is placed in the first riser 9a, and the spray nozzle 12-2b is placed in the inverted J-shaped duct 10a. The second dust collecting tank 13-2 is placed in the lowermost part of the inverted J-shaped duct 10a. This second dust collecting tank 13-2 serves as the second collision part.

And, as the exhaust gas is risen by the first riser 9a and is fallen by the inverted J-shaped duct 10a placed downstream of the first riser 9a, the exhaust gas is cooled; and, the cooled exhaust gas collides with the second dust collecting tank (second collision part) 13-2. The second dust collecting tank 13-2 is placed in the horizontal duct 9b used to change the direction of the exhaust gas just after collision, and it collects the solidified low-melting point metal salt. As a result, the low-melting point metal salt, which neither can be solidified by the first cooling part 12-1 nor can be divided into its solid component and its gas component by the first collision part 13-1, can be solidified and divided into its solid component and its gas component. In this manner, the low-melting point metal salt can be collected into the second dust collecting tank 13-2 for recovery.

On the other hand, the duct inner walls of the water cooling duct 12-1, first riser 9a and inverted J-shaped duct 10a are covered with a refractory 15, thereby preventing the water cooling duct 12-1, first riser 9a and inverted J-shaped duct 10a from being damaged by heat. Of these exhaust ducts, that is, the water cooling duct 12-1, first riser 9a and inverted J-shaped duct 10a, the water cooling duct 12-1 is constituted such that the inner surface temperature of the refractory 15 in the lower part of the duct to which dust can be easily attached may be 600° C. or lower, preferably, 500° C. or lower, by taking the kind and the thickness of the refractory into consideration. Also, since at least the first riser inner wall surface 13-1, with which the exhaust gas just after being through the water cooling duct 12-1, is covered with an abrasion resistant refractory 15a, the abrasion of the refractory 15a due to dust contained in the exhaust gas can be minimized.

To the horizontal duct 9b, a second riser 10b for guiding upwardly the exhaust gas after being collided with the second dust collecting tank 13-2, a lowering duct 10c connected to the rear part of this second riser 10b for lowering down the exhaust gas, and a horizontal duct 10d to be connected to exhaust gas treatment apparatus connected to the rear part of the exhaust gas duct apparatus, are connected. An air preheater 17 is placed in the lowering duct 10c. Thus, since the exhaust gas is allowed to flow down without accumulating dust in the air preheater 17 in the lowering duct 10c, air can be preheated without being clogged by dust. As a result, the temperature of preheated air C' can be increased and high heat recovery efficiency can also be maintained. Further, as the result of the increased temperature of the preheated air C', the fuel of the combustion burner of the rotary-hearth furnace 1 can be reduced and the exhaust gas treatment apparatus can be made compact.

Preferably, at least one or more of the water cooling duct 12-1, first riser 9a, inverted J-shaped duct 10a and second riser 10b may include a valve (not shown) for releasing the exhaust gas to the atmosphere. With this valve included, even when the exhaust fan (not shown) fails suddenly, the exhaust gas discharged from the rotary-hearth furnace 1 can be released to the atmosphere. When a draft within the exhaust gas duct is taken into account, more preferably, this valve may be set at the highest position of the exhaust gas duct, such as the top part of the first riser 9a or the top part between the second riser 10b and lowering duct 10c.

Next, description is given of an embodiment of a method for operating the exhaust gas duct apparatus of the invention for use in the rotary-hearth furnace along the flow of the exhaust gas with reference to FIGS. 3 and 4.

Firstly, the exhaust gas discharged from the rotary-hearth furnace 1 is guided through the discharge gas duct 8 into the horizontally arranged water cooling duct 12-1. By rapidly cooling the exhaust gas using this water cooling duct 12-1 down to a first cooling temperature, a part of the high-melting point metal salt in the exhaust gas is solidified and the exhaust gas just after being cooled is advanced directly to collide with the first riser inner wall surface 13-1. Due to this, the solidified high-melting point metal salt drops down and is collected into the first dust collecting tank 16.

On the other hand, the exhaust gas after collision, while changing its direction and rising substantially vertically upwardly along the first riser 9a, is cooled by a fluid injected from the spray nozzle 12-2a. Thereafter, the exhaust gas further turns around through the top part of the first riser 9a and, while flowing down through the inverted J-shaped duct 10a, is cooled again from the first cooling temperature to a further lower second cooling temperature by a fluid injected from the spray nozzle 12-2b. Thus, the low-melting point metal salt contained in the exhaust gas is solidified.

It is important that the first and second cooling temperatures to which the exhaust gas is cooled by the water cooling duct 12-1 and spray nozzles 12-2a and 12-2b can be respectively changed depending on the kind of the metal salt contained in the exhaust gas. For example, the first cooling temperature may be in the range of from 1000 to 1200° C. and the second cooling temperature may be in the range of from 450 to 900° C. Also, the cooling of the exhaust gas using the spray nozzles 12-2a and 12-2b is preferably carried out in such a manner that a fluid constituting of one of an inert gas, gas-water state water and air, or a combination of two or more of them is supplied directly into the exhaust gas. The spray nozzles 12-2a and 12-2b may also be placed in any one of the first riser 9a and inverted J-shaped duct 10a.

Next, the cooled exhaust gas flows down along the inverted J-shaped duct 10a and collides with the second dust collecting tank 13-2, whereby the low-melting point metal salt in the exhaust gas is collected into the second dust collecting tank 13-2. On the other hand, the exhaust gas after collision turns to the horizontal direction along the horizontal duct 9b, further rises substantially vertically upwardly along the first riser 10b up to the top part thereof and still further flows substantially vertically downwardly along the lowering duct 10c. The dust collected into the first dust collecting tank 16 and second dust collecting tank 13-2 is discharged successively or periodically according to the collecting efficiency and tank capacity. As the dust discharge method, there can be applied a successive discharge method using a scraper-type discharge apparatus. However, when the exhaust gas temperature is high, a water-seal type discharge method capable of discharging the dust as slurry is easily and securely used, rather than a mechanical discharge method.

The exhaust gas is heat-exchanged by the air preheater 17 placed in the lowering duct 10c for the air C charged into this air preheater 17. The heat-exchanged preheated air C' is used as the combustion air of a combustion burner which heats the rotary-hearth furnace 1. On the other hand, the heat-exchanged exhaust gas flows through the horizontal duct 10d and is cooled further by a cooler (not shown); and, thereafter, it is collected as dust by a dust collector and is then discharged to the atmosphere through an exhaust fan.

EXAMPLES

Comparison Example

Figure 5:
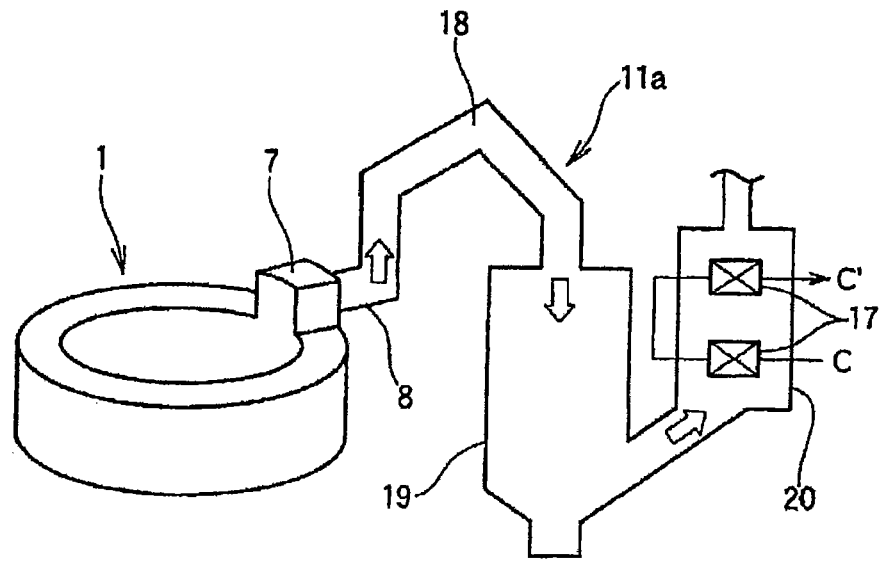
FIG. 5 is a schematic typical view of an exhaust gas apparatus for use in a rotary-hearth furnace according to a comparison example of the invention.
Figure 6:
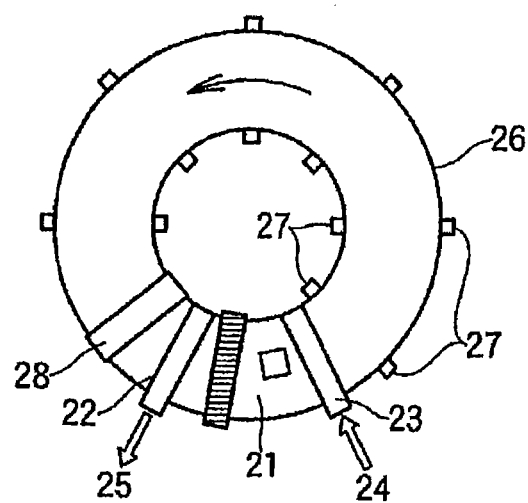
FIG. 6 is a schematic plan view of the structure of a rotary-hearth furnace according to the conventional art.

Firstly, description is given of an exhaust gas duct apparatus for use in a rotary-hearth furnace according to a comparison example with reference to FIG. 5. FIG. 5 is a schematic typical view of a main body of an exhaust gas duct apparatus according to a comparison example of the invention for use in a rotary-hearth furnace.

This exhaust gas duct apparatus 11a, which is connected to the exhaust gas duct 8 communicating with the exhaust gas discharge chamber 7 of the rotary-hearth furnace 1, includes a V-shaped duct 18 for sucking the exhaust gas in an inverted V-shape manner, a cooler 19 for cooling this exhaust gas with the flowing-down motion of the exhaust gas, and a preheater 20. The preheater 20 preheats air with an air preheater 17 for heat-exchanging with the exhaust gas after being cooled. Also, downstream of this, although not shown, there are placed a duct collector for collecting dust and an exhaust fan for sucking the exhaust gas after dust collection and blowing it out to the atmosphere.

A continuous working operation was carried out using the above-structured exhaust gas duct apparatus 11a for use in the rotation-hearth furnace 1. In the continuous working operation, the exhaust gas of 1300° C. discharged from the rotary-hearth furnace 1 is sucked into the V-shaped duct 18 and is introduced into and cooled by the cooler 19. Next, after the cooled exhaust gas is heat exchanged with the air C within the preheater 20, it is through the dust collector and discharged from the exhaust fan to the atmosphere.

During the above continuous working operation, the exhaust gas temperature measured in the outlet of the cooler 19 was 726° C. After passage of 23 days from the start of the continuous working operation, since the preheater 20 clogged, the exhaust gas duct apparatus 11a was caused to stop its operation. The heat recovery efficiency of the preheater 20 at 23 days after the start of the continuous working operation was lowered as much as 37.9% when compared with the time just after the start of the working operation. After stop of the operation, the accumulated state of the dust within the exhaust gas duct apparatus 11a was checked and the dust quantities were converted to quantities per unit time. The results were shown in Table 1.

TABLE 1

| | Dust Collected Parts in Comparison Example | Dust Quantity |
|---|---|---|
| 1 | Top part of V-shaped duct | 3 kg/h |
| 2 | Direction change part downstream of cooler | 3 kg/h |
| 3 | Air preheater | 12 kg/h |

That is, according to the exhaust gas duct apparatus 11a of the comparison example and the operation results thereof, due to the cooling of the exhaust gas by the cooler 19, the exhaust gas temperature in the outlet of the cooler 19 is 726° C. This temperature is sufficient for solidification of the high-melting point metal salt but, since the cooling is carried out in one stage, the temperature is not lowered any more and thus it can be said that solidification of the low-melting point metal salt is insufficient. As a result, although a dust collecting apparatus is not provided, as shown in Table 1, the quantity of dust within the exhaust gas duct apparatus 11a is relatively small in the top part of the V-shaped duct 18. However, since the air preheater 17 is placed inside of the preheater 20 where the exhaust gas rises, dust is easy to stay in the upper part of the air preheater 17 and the like. Consequently, the quantity of dust having attached to the air preheater 17 was large.

Example

On the other hand, a exhaust gas duct apparatus for use in a rotary-hearth furnace used as this example is the same in structure as the exhaust gas duct apparatus 11 according to the embodiment of the invention described above using FIG. 4. This example using the exhaust gas duct apparatus for use in the rotary-hearth furnace was operated continuously according to a method similar to the operating method of the exhaust gas duct apparatus 11 according to the embodiment of the invention described above using FIG. 4.

Description is given below of the results of the above continuous operation of this example with reference to FIG. 4. During operation, the exhaust gas, after having collided with the first riser inner wall surface 13-1, starts to rise along the first riser 9a. The exhaust gas temperature at this position was 1081° C. The exhaust gas, after having flown down within the inverted J-shaped duct and collided with the liquid surface of the second dust collecting tank 13-2, starts to move along the horizontal duct 9b. The exhaust gas temperature at this position was 685° C.

The exhaust gas duct apparatus 11, after start of the operation, could be operated continuously for 180 days without the duct interior part being clogged. Also, the heat recovery efficiency of the air preheater 17 at 180 days after the start of the continuous operation could be reduced down to as small as 4.8% when compared with the time just after start of the operation. After stop of the operation, the accumulated state of dust within the exhaust gas duct apparatus 11 was checked and the accumulated dust quantities were converted to quantities per unit time. The results were as shown in Table 2.

TABLE 2

| Dust Collected Parts in Example | | Dust Quantity |
| --- | --- | --- |
| 1 | First dust collecting tank | 6 kg/h |
| 2 | Second dust collecting tank | 10 kg/h |
| 3 | Air preheater | 0.5 kg/h |

That is, according to the exhaust gas duct apparatus 11 of this execution example and the operation results thereof, the high-melting point metal salt contained in the exhaust gas is solidified by the first cooling part constituted of the water cooling duct 12-1, and the low-melting point metal salt contained in the exhaust gas is solidified by the second-stage cooling part constituted of the spray nozzles 12-2a and 12-2b; namely, effective solidification through the two stages is possible. Therefore, as shown in Table 2, the dust collecting quantities in the first dust collecting tank 16 and second dust collection tank 13-2 are very large.

However, since the dust collected into these dust collecting tanks 16 and 13-2 is discharged continuously or periodically, the duct never clogs the exhaust gas passage area within the exhaust gas duct apparatus 11. On the other hand, since the air preheater 17 is placed in the lowering duct 10c where the exhaust gas flows down, the dust is easy to drop down together with the exhaust gas. Therefore, the quantity of the dust having stayed or attached to the upper part and the like of the air preheater 17 was as small as 0.5 kg/h. In the other ducts within the exhaust gas duct apparatus 11 as well, the quantity of dust having stayed or attached thereto was extremely small.

As described above, in the exhaust gas duct apparatus of the invention for use in the rotary-hearth furnace, the cooling part for cooling the exhaust gas discharged from the rotary-hearth furnace to solidify the metal salt contained in the exhaust gas, the collision part for allowing the exhaust gas just after being cooled to collide therewith to drop down the metal salt, and the direction change duct for guiding the exhaust gas after collision in a direction other than the direction of dropping the metal salt are arranged in the above-mentioned order in two stages within the exhaust gas duct. Thus, the metal salt contained in the exhaust gas is solidified at the two-stage cooling temperatures and collected, whereby the solidifying efficiency and collecting efficiency of the metal salt can be enhanced, the dust adhesion or accumulation within the exhaust gas duct can be minimized and thus the long stable operation of the apparatus is possible.

Also, according to the method for operating the exhaust gas duct apparatus of the invention for use in the rotary-hearth furnace, when cooling the exhaust gas using the cooling part, since the exhaust gas cooling temperature can be changed depending on the kind of metal salts contained in the exhaust gas, the solidification of the metal salt can be carried out effectively and surely. Further, since the second cooling part cools the exhaust gas by supplying directly any one of an inert gas, gas-water state water and air or a combination of two or more of them, the low-melting point metal salt contained in the exhaust gas can be solidified more effectively.

While the present invention has been described in detail and with reference to specific embodiments thereof, it will be apparent to one skilled in the art that various changes and modifications can be made therein without departing from the spirit and scope thereof.

This application is based on Japanese Patent Application No. 2010-196415 filed on Sep. 2, 2010, the entire subject matters of which are incorporated herein by reference.

DESCRIPTION OF REFERENCE NUMERALS AND SIGNS

1: Rotary-hearth furnace
2: Outer circumferential wall
3: Inner circumferential wall
4: Ceiling part
5: Rotary hearth
5a: Hearth body frame
5b: Hearth heat insulator or refractory
6: Starting material for granular metallic iron
7: Exhaust gas discharge chamber
8: Exhaust gas duct
8a: Water cooling jacket
9a: First riser (first direction change duct)
9b: Horizontal duct (second direction change duct)
10a: Inverted J-shaped duct
10b: Second riser
10c: Lowering duct
10d: Horizontal duct
11, 11a: Exhaust gas duct apparatus
12: Cooling part
12-1: Water cooling duct (first cooling part)
12-2a, 12-2b: Spray nozzle (second cooling part)
13: Collision part
13-1: First riser inner wall surface (first collision part)
13-2: Second dust collecting tank (second collision part)
14: Direction change duct
15: Refractory
15a: Abrasion resistant refractory
16: First dust collecting tank
17: Air preheater
18: V-shaped duct
19: Cooler
20: Preheater

The invention claimed is:

1. An exhaust gas duct apparatus for use in a rotary-hearth furnace for heating a starting material including a carbonaceous reducing material and an iron-oxide containing material to produce reduced iron or granular metallic iron, comprising:
an exhaust gas duct connected to carry exhaust from the rotary-hearth furnace,
a first cooling part for cooling exhaust gas discharged from the exhaust gas duct to solidify a metal salt in the exhaust gas,
a first collision part for allowing the exhaust gas, just after being cooled in the first cooling part, to collide with the first collision part, whereby the solidified metal salt drops from the cooled exhaust gas,
a first direction change duct for guiding the collided exhaust gas in a direction other than a direction of dropping of the metal salt;

a second cooling part for cooling exhaust gas discharged from the first direction change duct to solidify another metal salt in the exhaust gas, a second collision part for allowing the exhaust gas, just after being cooled in the second cooling part, to collide with the second collision part, whereby the solidified another metal salt drops from the cooled exhaust gas, and a second direction change duct for guiding the collided exhaust gas in a direction other than a direction of dropping of the another metal salt.

2. The exhaust gas duct apparatus for use in a rotary-hearth furnace according to claim 1, wherein the first cooling part is arranged to cool the exhaust gas discharged from the rotary-hearth furnace to a temperature of from 1000 to 1200° C., and the second cooling part is arranged to cool the exhaust gas to a temperature of from 450 to 900° C.

3. The exhaust gas duct apparatus for use in a rotary-hearth furnace according to claim 2, wherein the first collision part is placed just past the first cooling part in a flow direction of the exhaust gas, and wherein the second collision part is placed past the second cooling part in the flow direction of exhaust gas.

4. The exhaust gas duct apparatus for use in a rotary-hearth furnace according to claim 2, wherein the first cooling part includes a water cooling duct.

5. The exhaust gas duct apparatus for use in a rotary-hearth furnace according to claim 4, wherein the water cooling duct is arranged horizontally just before the first collision part in the flow direction of exhaust gas.

6. The exhaust gas duct apparatus for use in a rotary-hearth furnace according to claim 5, wherein the water cooling duct provides water cooling is only on a lower part of the water cooling duct.

7. The exhaust gas duct apparatus for use in a rotary-hearth furnace according to claim 4, wherein the water cooling duct has a lined refractory structure, and the water cooling duct is arranged to maintain an inner surface temperature of the lined refractory structure at 600° C. or lower.

8. The exhaust gas duct apparatus for use in a rotary-hearth furnace according to claim 2, wherein the second cooling part injects a fluid directly into contact with the exhaust gas.

9. The exhaust gas duct apparatus for use in a rotary-hearth furnace according to claim 4, wherein the first direction change duct includes a first riser extending substantially vertically upwardly, the first collision part includes an inner wall surface of the first riser, and the first riser inner wall surface at the first collision part comprises an abrasion resistant refractory.

10. The exhaust gas duct apparatus for use in a rotary-hearth furnace according to claim 9, wherein the second direction change duct includes a horizontal duct substantially horizontally arranged in a lowermost part of an inverted J-shaped duct connected to and descending from a top part of the first riser, the second collision part is a dust collecting tank placed in the horizontal duct, the second cooling part is placed in at least any one of the first riser and the inverted J-shaped duct, and the exhaust gas cooled through the second cooling part is allowed to be collided with the second collision part.

11. The exhaust gas duct apparatus for use in a rotary-hearth furnace according to claim 10, wherein the exhaust gas allowing to be collided with the dust collecting tank is allowed to rise through a second riser, and an air preheater is placed in a lowering duct connected to a rear part of the second riser.

12. The exhaust gas duct apparatus for use in a rotary-hearth furnace according to claim 3, wherein the first cooling part includes a water cooling duct.

13. The exhaust gas duct apparatus for use in a rotary-hearth furnace according to claim 12, wherein the water cooling duct is arranged horizontally just before the first collision part in the flow direction of exhaust gas.

14. The exhaust gas duct apparatus for use in a rotary-hearth furnace according to claim 13, wherein the water cooling duct provides water cooling only on a lower part of the water cooling duct.

15. The exhaust gas duct apparatus for use in a rotary-hearth furnace according to claim 12, wherein the water cooling duct has a lined refractory structure, and the water cooling duct is arranged to maintain an inner surface temperature of the lined refractory structure at 600° C. or lower.

16. The exhaust gas duct apparatus for use in a rotary-hearth furnace according to claim 12, wherein the first direction change duct includes a first riser extending substantially vertically upwardly, the first collision part includes an inner wall surface of the first riser, and the first riser inner wall surface at the first collision part comprises an abrasion resistant refractory.

* * * * *